June 13, 1967  R. M. DAVIS  3,324,577
TEACHING APPARATUS
Original Filed Dec. 16, 1963
2 Sheets-Sheet 1
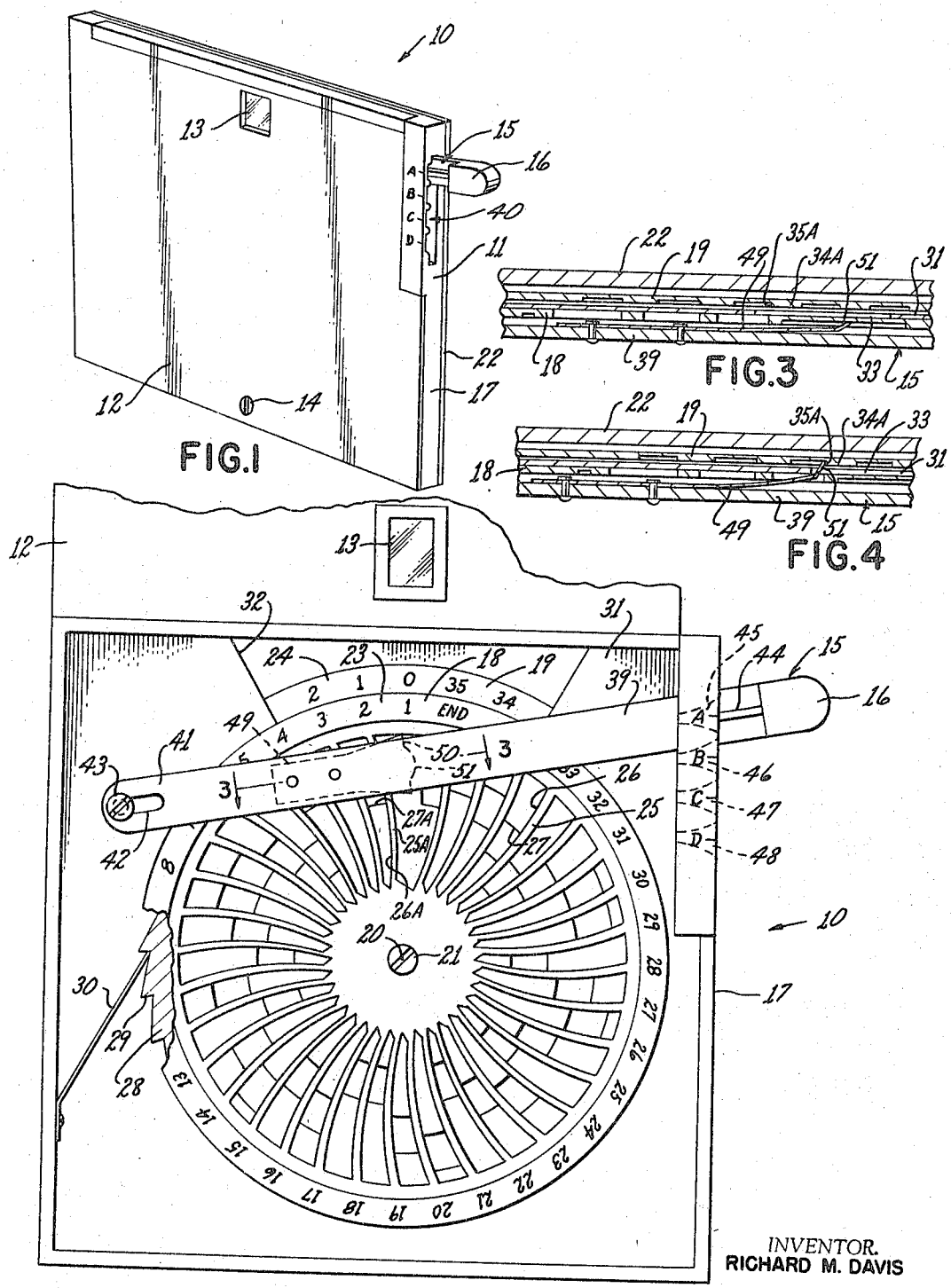
INVENTOR.
RICHARD M. DAVIS
BY
Caudr & Caudr
HIS ATTORNEYS

INVENTOR.
RICHARD M. DAVIS

BY Cardn & Cardn
HIS ATTORNEYS

United States Patent Office 3,324,577
Patented June 13, 1967

3,324,577
TEACHING APPARATUS
Richard M. Davis, 4417 Glenheath Drive,
Kettering, Ohio 45440
Continuation of abandoned application Ser. No. 330,708, Dec. 16, 1963. This application June 3, 1966, Ser. No. 560,367
10 Claims. (Cl. 35—48)

This application is a continuation of its copending parent patent application, Ser. No. 330,708, filed Dec. 16, 1963, and now abandoned.

This invention relates to an improved teaching apparatus.

One of the features of this invention is to provide a teaching apparatus wherein the student or the like will be presented with a box-like container having a movable lever for selecting one of a multiple choice of answers. The student will also be given a list of numbered questions together with a multiple choice of answers for each question whereby the student will view the container to see which question is now to be answered.

Thereafter, the student makes his choice of the answer for the particular question and actuates the lever of the container in accordance with the selection whereby the operating mechanism of the container will indicate to the student whether the correct answer has been given for a particular question.

However, the teaching apparatus for this invention is so constructed and arranged that the student only gets one chance to select a proper answer for a particular question and, thereafter, must proceed to answer the next question in sequence whether the preceding question was answered properly or not.

The teaching apparatus of this invention is so constructed and arranged that the same automatically records the number of correct answers given by the student for a particular set of questions whereby when the student has finished a complete set of questions, the teaching apparatus will indicate how many total correct answers had been given for the complete set of questions. The actuated teaching apparatus must then be handled by an instructor or the like to reset the teaching apparatus for the same set of questions or for another set of questions, as will be apparent hereinafter.

Accordingly, it is an object of this invention to provide an improved teaching apparatus having one or more of the novel features set forth above or hereinafter shown or described.

Other objects, uses and advantages of this invention are apparent from a reading of this description, which proceeds with reference to the accompanying drawings forming a part thereof and wherein:

FIGURE 1 is a perspective view of the improved teaching apparatus of this invention.

FIGURE 2 is an enlarged, front view of the apparatus illustrated in FIGURE 1 with the cover member thereof disposed in its open position.

FIGURE 3 is an enlarged, fragmentary, cross-sectional view taken on line 3—3 of FIGURE 2.

FIGURE 4 is a view similar to FIGURE 3 and illustrates the lever of the teaching apparatus in another operating position thereof.

Figure 5:
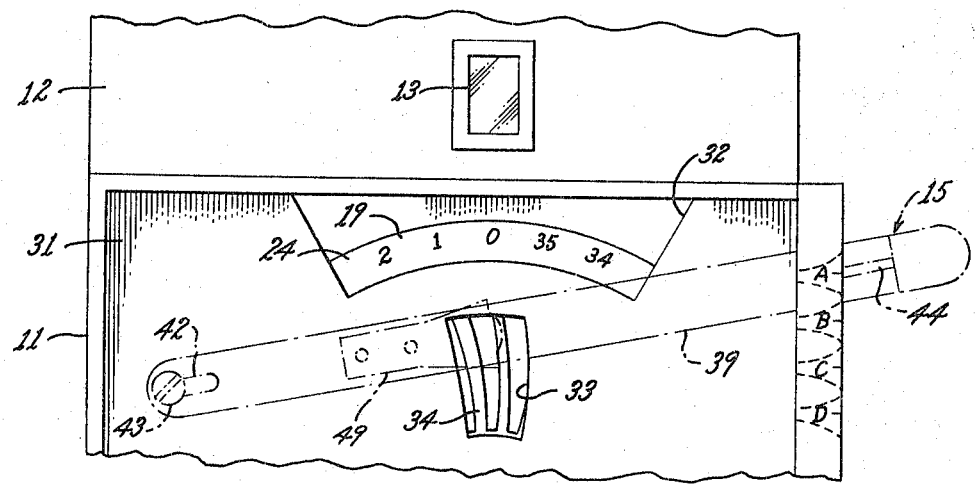
FIGURE 5 is a fragmentary view similar to FIGURE 2 with the lever and question wheel removed.

While the various features of this invention are hereinafter described and illustrated as being particularly adaptable for providing a teaching apparatus or the like, it is to be understood that the various features of this invention can be utilized singly or in any combination thereof to provide other devices as desired.

Therefore, this invention is not to be limited to only the embodiment illustrated in the drawings, because the drawings are merely utilized to illustrate one of the wide variety of uses of this invention.

Referring now to FIGURE 1, the improved teaching apparatus of this invention is generally indicated by the reference numeral 10 and comprises a substantially rectangular, rigid box-like container 11 having an openable cover member 12 provided with a glass closed opening 13 for a purpose hereinafter described.

The cover member 12 of the container 11 is adapted to be locked in its closed position by a conventional key-operated lock means 14, whereby the contents of the container 11 cannot be tampered with by the student and can only be opened by the instructor or the like who retains the key.

An actuating lever 15 is disposed in the container 11 and has a handle portion 16 projecting out of the side 17 thereof for selecting one of a multiple choice of answers represented respectively by the reference numerals A, B, C, D, etc., the number of multiple choices for the teaching apparatus 10 being any desired number, as will be apparent hereinafter.

A pair of rotatable wheels 18 and 19 are rotatably mounted in the container 11 to be respectively rotated about a common axis 20, as defined by a removable fastening member 21 respectively passing through the wheels 18 and 19 and being interconnected to the back wall 22 of the container 11.

Thus, not only does the fastening member 21 rotatably mount the wheels 18 and 19 in the container 11, but also the fastening member 21 permits the wheel 18 to be removed from the container 11 and another wheel similar to wheel 18 to be placed therein in a manner hereinafter described.

The rotatable wheel 18 will be hereinafter referred to as the question wheel 18 and the wheel 19 will be hereinafter referred to as the answer wheel 19 for reasons that will be hereinafter apparent.

The question wheel 18 has a peripheral edge portion 23 provided with numbers in sequence thereon in a counterclockwise direction, as illustrated in FIGURE 2, and terminates with the word "End" to indicate that all of the questions have been answered, either correctly or incorrectly, as will be apparent hereinafter.

The numbers on the peripheral portion 23 of the question wheel 18 are serially viewable through the glass closed opening 13 of the cover member 12, so that each time a question is answered and the question wheel 18 is advanced or indexed in a manner hereinafter described. the next question number will appear at the window 13.

The answer wheel 19 also has a peripheral portion 24 extending beyond the peripheral portion 23 of the question wheel 18 and carries a sequence of numbers in a counterclockwise direction thereof from 0 to the total number of question numbers on the question wheel 18 for a purpose which will be apparent hereinafter, the correct answer numbers on the answer wheel 19 being serially viewable through the windowed opening 13 in the cover member 12 of the container 11 for a purpose hereinafter described.

As illustrated in FIGURES 2 and 3, the question wheel 18 has a plurality of raised ridge means 25 disposed in spaced and arcuate relation around the upper surface thereof to define edge means or shoulder means 26 for a purpose hereinafter described.

The question wheel 18 has a plurality of openings 27 passing directly therethrough between each adjacent pair of ridge means 25 in a predetermined pattern thereon for a purpose hereinafter described.

The rear portion 28 of the question wheel 18 has a ratchet-like teeth 29 about the outer periphery thereof whereby counterclockwise rotation of the question wheel 18 is prevented by a leaf spring 30 receivable between adjacent teeth 29 in the manner illustrated in FIGURE 2, the leaf spring 30 permitting clockwise rotation of the question wheel 18, as will be apparent hereinafter.

A separator sheet of material 31 is carried by the container 11 and is disposed between the question wheel 18 and the answer wheel 19 as illustrated in FIGURES 3–5, the separator sheet 31 having a cutout 32 to permit viewing of the peripheral edge portion 24 of the answer wheel 19 and having the medial portion thereof cut out at 33 for a purpose hereinafter described.

Figure 6:
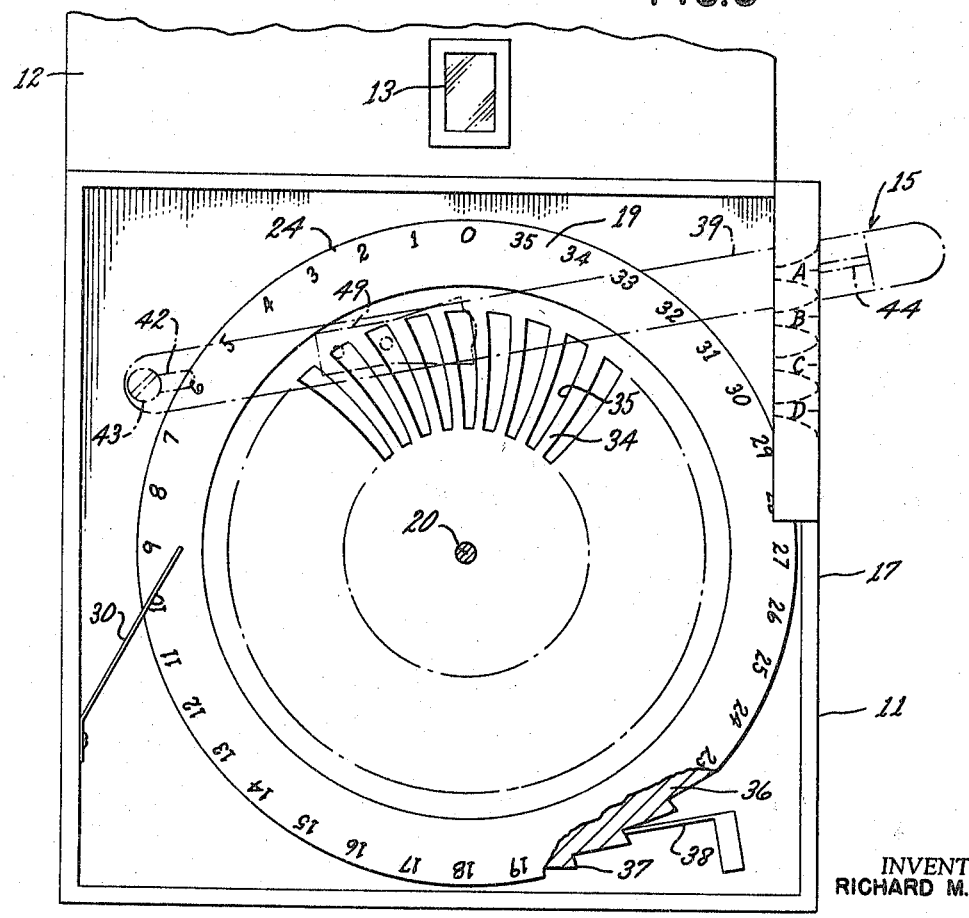
FIGURE 6 is a view similar to FIGURE 2, with the separator of FIGURE 5 removed.

The answer wheel 19 has a plurality of raised arcuate and spaced ridges 34 extending outwardly from the front surface thereof, as illustrated in FIGURES 3 and 6, which respectively define edge means or shoulder means 35 for a purpose hereinafter described, the ridge means 34 of the answer wheel 19 being uniform throughout the circumference of the answer wheel 19.

The answer wheel 19 also has the rear portion 36 thereof provided with a plurality of ratchet-like teeth 37 around the outer periphery thereof whereby a leaf spring 38 carried by the container 11 will prevent counterclockwise rotation of the answer wheel 19 but permit clockwise rotation thereof for a purpose hereinafter described.

The lever 15 has a flat portion 39 projecting through an elongated slot 40 in the side 17 of the container 11 and is provided with an end 41 having an elongated slot 42 receiving a pivot pin 43, whereby the pivot pin 43 fastens the lever 15 in the container 11 while permitting pivotal movement of the lever 15 within the confines of the slot 40, as well as inward and outward movement thereof as defined by the length of the elongated slot 42 for a purpose herein after described.

A ridge member 44 extends from the handle portion 16 of the lever 15 and is adapted to be respectively receivable in slots 45, 46, 47 and 48 formed in the side 17 of the container 11 and representing respectively answer selections A–D, the slots 45–48 being interconnected to the slot 40.

The rear side of the medial portion 39 of the lever 15 carries a spring arm or finger 49 having a right hand edge 50 which is wider than any of the slots or openings 27 in the question wheel 18 for a purpose hereinafter described, the forward edge 50 of the arm 49 also having a rearwardly extending tongue 51 which is narrower than any particular opening 27 in the question wheel 18.

In view of the above, it can be seen that the teaching apparatus 10 of this invention can be formed from a relatively few parts that can be simply and economically manufactured, whereby the overall cost of the teaching apparatus 10 of this invention is relatively small.

The operation of the teaching apparatus 10 of this invention will now be described.

Before the teaching apparatus 10 is given to the student or the like, the instructor unlocks the cover member 12 and opens the cover member 12 in the manner illustrated in FIGURE 2 to manually advance the question wheel 18 to the position illustrated in FIGURE 2 and to manually advance the answer wheel 19 to the position illustrated in FIGURE 2, whereby when the cover member 12 is again closed in its locked position illustrated in FIGURE 1, the student will view that the question wheel indicates that Question No. 1 is to be answered and that the answer wheel 19 indicates that at that time no correct answers have been given.

Thereafter, the student is given a set of multiple choice questions which corresponds to the particular question wheel 18 disposed in the teaching apparatus 10.

Thus, the student looks at Question No. 1 on his list and determines which one of the four multiple choice answers therefor would be his selection for the answer of Question No. 1.

Assuming that the student selects Answer B for the Question No. 1 and that Answer B is the correct answer for Question No. 1, the student positions the ridge 44 of the lever 15 adjacent the slot 46 in the side 17 of the container 11 and pushes inwardly on the lever 15 from the position illustrated in FIGURE 2 until leftward movement of the lever 15 is terminated by the pin 43 abutting the right hand end of the slot 42. During this leftward movement of the lever 15, the tongue 51 of the arm 49 snaps over the ridge 25A in FIGURE 2 and because the right answer has been selected by the student the tongue 51 snaps through the opening 27A in the question wheel 18 and the aligned opening 33 of the separator sheet 31 to be received at the left of ridge 34A of the answer wheel 19 in the manner illustrated in FIGURE 4.

Thereafter, the student pulls outwardly on the lever 15, whereby the lever 15 moves from its left hand position back to its right hand position, as illustrated in FIGURE 2, whereby the tongue 51 of the arm 49 engages the shoulder 35A of the ridge 34A and causes the answer wheel 19 to move one increment in a clockwise direction, whereby the number 1 on the answer wheel 19 will now be viewed through the window 13 of the cover member 12 of the container 11 to indicate to the student that he has picked the correct answer. Simultaneously with the movement of the answer wheel 19, the right hand portion 50 of the arm 49 engages the shoulder 26A of the ridge 25A of the question wheel 18 and moves the question wheel 18 one increment in a clockwise direction, whereby the numeral 2 on the question wheel 18 will now be viewed through the window opening 13 in the cover member 12 of the container 11 to indicate to the student that he is now to answer Question No. 2.

Alternately, let's consider that the student, when answering Question No. 1, selected Answer D, which is an incorrect answer to Question No. 1.

In this case, the student has moved the lever 15 downwardly from the position illustrated in FIGURE 2 until the ridge 44 of the lever 15 is adapted to enter the slot 48 in the side 17 of the container 11. With the lever moved to the left while at the answer position D, it can be seen that the tongue 51 of the arm 39 of the lever 15 will be out of alignment with the answer opening 27A in the question wheel 18, whereby rightward movement of the lever 15 will cause the question wheel 18 to advance one increment to position 2 thereof at the windowed opening 13 in the cover member 12, while the answer wheel 19 will remain in the position illustrated in FIGURE 2 and indicated that a right answer has not been chosen.

Thus, it can be seen that for each question answered by the student the question wheel 18 will advance one increment, while the answer wheel 19 will only advance one increment for each correct answer selected by the student.

In this manner, the student answers all of the questions, either rightly or wrongly, on the sheet of paper given to him until the question wheel 18 has the term "End" in alignment with the windowed opening 13 in the cover member 12 of the container 11.

When the question wheel 18 has been advanced to the "End" position thereof, further actuation of the lever 15 will not cause the question wheel 18 or answer wheel 19 to move from their final positions because of the wide space between the adjacent pair of ridge means 25 at the "End" position of the question wheel 18 and because no opening 27 is provided in the question wheel 18 at this position of the question wheel 18.

At this time, the student can see the total number of correct answers that he has given to a particular set of questions by noting the number viewed through the windowed opening 13 of the cover member 12 on the answer wheel 19 to determine his score on the particular set of questions.

Therefore, it can be seen that the teaching apparatus 10 of this invention automatically records the score of the student for a particular set of questions keyed to the openings 27 in the question wheel 18.

If the instructor wishes to utilize the teaching apparatus 10 with a different set of keyed questions, he can replace the question wheel 18 in the container 11 with another question wheel 18 having the slots 27 formed therein in a different sequence or pattern to correspond to a different set of questions so that the student cannot learn a particular pattern for selecting the correct answers for the teaching apparatus 10.

Accordingly, it can be seen that an improved teaching apparatus 10 is provided by this invention which has many unique features over prior known teaching apparatus, the teaching apparatus of this invention being relatively simple in design and economical to manufacture.

While the form of the invention now preferred has been disclosed as required by the statutes, other forms may be used, all coming within the scope of the claims which follow.

What is claimed is:

1. A teaching apparatus comprising a frame means, a first member movably mounted to said frame means and having lever actuatable means arranged in a predetermined pattern, a second member movably mounted to said frame means and having lever actuatable means arranged in a predetermined pattern, and a lever movably mounted to said frame means with said first member being disposed between said level and said second member, said lever being movable by the user to various answering positions thereof and being movable from a selected answering position thereof to an actuated position thereof, said answering positions of said lever being related to said predetermined patterns of said lever actuatable means of said members, said lever having actuating means for always advancing said first member one increment of movement thereof by actuating said lever actuatable means of said first member each time an answer is selected by the operator moving said lever from a selected answering position thereof to said actuating position thereof and for only advancing said second member one increment of movement thereof by actuating said level actuatable means of said second member each time a correct answer is selected by the operator so moving said lever.

2. A teaching apparatus as set forth in claim 1 wherein said actuating means of said lever comprises a single finger carried by said lever.

3. A teaching apparatus as set forth in claim 2 wherein said finger has a first portion for engaging said lever actuatable means for said first member and a second portion for projecting through said first member and engaging said lever actuatable means of said second member.

4. A teaching apparatus as set forth in claim 2 wherein said first member has openings formed therethrough in a predetermined pattern related to said answering positions of said lever so that said second portion only projects through one of said openings when a correct answer has been selected by the operator so moving said lever.

5. A teaching apparatus as set forth in claim 1 wherein said lever actuatable means of said first member comprises ridge means respectively engageable by said actuating means of said lever for advancing said first member one increment each time said lever is moved by the operator to its actuated position.

6. A teaching apparatus as set forth in claim 1 wherein said lever actuatable means of said second member comprises ridge means respectively engageable by said actuating means of said lever for advancing said second member each time said lever is moved by the operator to its actuated position only from a correct answer position thereof.

7. A teaching apparatus as set forth in claim 1 wherein said frame means comprises a container housing said members and lever therein, said members being rotatably mounted inside said container.

8. A teaching apparatus as set forth in claim 7 wherein said container has an opening therein for viewing parts of said members.

9. A teaching apparatus as set forth in claim 7 wherein said lever has an actuating end and wherein said container has an opening means, said actuating end of said lever projecting out of said container through said opening means to be grasped and moved by the operator.

10. A teaching apparatus as set forth in claim 1 wherein said second member has an edge portion extending beyond said first member.

References Cited
UNITED STATES PATENTS 2,871,577    2/1959    Davis _____ 35—9

EUGENE R. CAPOZIO, *Primary Examiner.*

W. W. NIELSEN, *Assistant Examiner.*